United States Patent
Shrestha et al.

(10) Patent No.: US 11,621,805 B2
(45) Date of Patent: Apr. 4, 2023

(54) UPLINK HYBRID AUTOMATIC REPEAT REQUEST RETRANSMISSION SCHEDULING IN A NETWORK WITH A LARGE PROPAGATION DELAY

(71) Applicant: QUALCOMM Incorporated, San Diego, CA (US)

(72) Inventors: Bharat Shrestha, San Diego, CA (US); Xiao Feng Wang, San Diego, CA (US); Ayan Sengupta, San Diego, CA (US); Umesh Phuyal, San Diego, CA (US); Liangping Ma, San Diego, CA (US); Alberto Rico Alvarino, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 92 days.

(21) Appl. No.: 17/248,110

(22) Filed: Jan. 8, 2021

(65) Prior Publication Data
US 2022/0224449 A1  Jul. 14, 2022

(51) Int. Cl.
*H04L 1/18* (2006.01)
*H04W 72/12* (2009.01)
(Continued)

(52) U.S. Cl.
CPC ............ *H04L 1/1819* (2013.01); *H04L 1/203* (2013.01); *H04W 24/08* (2013.01);
(Continued)

(58) Field of Classification Search
CPC ...... H04L 1/1819; H04L 1/203; H04W 76/27; H04W 72/1226; H04W 72/1289;
(Continued)

(56) References Cited

U.S. PATENT DOCUMENTS

| | | | |
|---|---|---|---|
| 2016/0100422 A1* | 4/2016 | Papasakellariou | H04L 1/1861 370/329 |
| 2020/0259601 A1* | 8/2020 | Zhou | H04W 76/11 |
| 2020/0296673 A1* | 9/2020 | Ouchi | H04W 52/38 |
| 2020/0314948 A1* | 10/2020 | Babaei | H04L 1/1854 |
| 2021/0099254 A1* | 4/2021 | Babaei | H04L 1/1896 |

FOREIGN PATENT DOCUMENTS

WO  2019144898 A1  8/2019

OTHER PUBLICATIONS

Ericsson: "On HARQ Enhancements for NTN", 3GPP TSG-RAN WG1 Meeting #103-e, R1-2009093, 3rd Generation Partnership Project, Mobile Competence Centre, 650, Route Des Lucioles, F-06921 Sophia-Antipolis Cedex, France, vol. RAN WG1, No. E-Meeting, Oct. 26, 2020-Nov. 13, 2020 Oct. 24, 2020, pp. 1-11, XP051946822.

(Continued)

*Primary Examiner* — Candal Elpenord
(74) *Attorney, Agent, or Firm* — Harrity & Harrity, LLP; Dang M. Vo

(57) ABSTRACT

Various aspects of the present disclosure generally relate to wireless communication. In some aspects, a user equipment (UE) may transmit, to a base station, a first physical uplink shared channel (PUSCH) using one or more physical layer (PHY) parameters associated with a first block error rate (BLER) target performance. The UE may receive, from the base station prior to expiration of a round trip timer associated with the first PUSCH, downlink control information (DCI) scheduling a second PUSCH and configuring one or more PHY parameters associated with a second BLER target performance. The UE may transmit, to the base station, the second PUSCH using the PHY parameter(s) associated with the second BLER target performance, wherein the second PUSCH includes a retransmission of the first PUSCH or a new transmission based at least in part on a hybrid automatic (Continued)

repeat request process indicated in the DCI. Numerous other aspects are described.

30 Claims, 8 Drawing Sheets

(51) Int. Cl.
  H04L 1/20    (2006.01)
  H04W 76/27   (2018.01)
  H04W 72/14   (2009.01)
  H04W 24/08   (2009.01)
  H04L 1/1812  (2023.01)
(52) U.S. Cl.
  CPC ........... *H04W 72/1226* (2013.01); *H04W 72/1289* (2013.01); *H04W 72/14* (2013.01); *H04W 76/27* (2018.02)
(58) Field of Classification Search
  CPC ..... H04W 72/14; H04W 72/04; H04W 24/08; H04W 24/06
  USPC .................................................. 370/329–330
  See application file for complete search history.

(56) References Cited

OTHER PUBLICATIONS

Ericsson: "Use of MCS-C-RNTI in C-RNTI MAC CE", 3GPP TSG-RAN WG2#103, R2-1811875, 3rd Generation Partnership Project, Mobile Competence Centre, 650, Route Des Lucioles, F-06921 Sophia-Antipolis Cedex, France, vol. RAN WG2, No. Gothenburg, Sweden, Aug. 20, 2018-Aug. 24, 2018 Aug. 9, 2018, pp. 1-2, XP051521513.

Interdigital (Email Discussion Rapporteur): "Summary of [AT112-e][103][NTN] RACH and HARQ Feedback Aspects", e3GPP RAN WG2 Meeting #112e, 3GPP Draft, R2-2010764, 3rd Generation Partnership Project, Mobile Competence Centre, 650, Route Des Lucioles, F-06921 Sophia-Antipolis Cedex, France, vol. RAN WG2, No. E Meeting, Nov. 2, 2020-Nov. 13, 2020 Nov. 16, 2020, pp. 1-21, XP051955346.

Interdigital Inc: "Discussion on HARQ for NTN", 3GPP TSG RAN WG1 Meeting #96bis, R1-1904859 Discussion on HARQ for NTN, 3rd Generation Partnership Project, Mobile Competence Centre, 650, Route Des Lucioles, F-06921 Sophia-Antipolis Cedex, France, vol. RAN WG1, No. Xi'an, China, Apr. 8, 2019-Apr. 12, 2019 Apr. 7, 2019, pp. 1-6, XP051700006.

International Search Report and Written Opinion—PCT/US2021/072818—ISA/EPO—dated Apr. 8, 2022.

* cited by examiner

UPLINK HYBRID AUTOMATIC REPEAT REQUEST RETRANSMISSION SCHEDULING IN A NETWORK WITH A LARGE PROPAGATION DELAY

FIELD OF THE DISCLOSURE

Aspects of the present disclosure generally relate to wireless communication and to techniques and apparatuses for uplink hybrid automatic repeat request (HARQ) retransmission scheduling in a network with a large propagation delay.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors operatively coupled to the memory, the memory and the one or more processors configured to: transmit, to a base station, a first physical uplink shared channel (PUSCH) using one or more physical layer (PHY) parameters associated with a first block error rate (BLER) target performance; receive, from the base station prior to expiration of a round trip timer associated with the first PUSCH, downlink control information (DCI) scheduling a second PUSCH and configuring one or more PHY parameters associated with a second BLER target performance; and transmit, to the base station, the second PUSCH using the one or more PHY parameters associated with the second BLER target performance, wherein the second PUSCH includes a retransmission of the first PUSCH or a new transmission based at least in part on a hybrid automatic repeat request (HARQ) process indicated in the DCI.

In some aspects, a method of wireless communication performed by a UE includes transmitting, to a base station, a first PUSCH using one or more PHY parameters associated with a first BLER target performance; receiving, from the base station prior to expiration of a round trip timer associated with the first PUSCH, DCI scheduling a second PUSCH and configuring one or more PHY parameters associated with a second BLER target performance; and transmitting, to the base station, the second PUSCH using the one or more PHY parameters associated with the second BLER target performance, wherein the second PUSCH includes a retransmission of the first PUSCH or a new transmission based at least in part on a HARQ process indicated in the DCI.

In some aspects, an apparatus for wireless communication includes means for transmitting, to a base station, a first PUSCH using one or more PHY parameters associated with a first BLER target performance; means for receiving, from the base station prior to expiration of a round trip timer associated with the first PUSCH, DCI scheduling a second PUSCH and configuring one or more PHY parameters associated with a second BLER target performance; and means for transmitting, to the base station, the second PUSCH using the one or more PHY parameters associated with the second BLER target performance, wherein the second PUSCH includes a retransmission of the first PUSCH or a new transmission based at least in part on a HARQ process indicated in the DCI.

In some aspects, a non-transitory computer-readable medium storing a set of instructions for wireless communication includes one or more instructions that, when executed by one or more processors of a UE, cause the UE to: transmit, to a base station, a first PUSCH using one or more PHY parameters associated with a first BLER target performance; receive, from the base station prior to expiration of a round trip timer associated with the first PUSCH, DCI scheduling a second PUSCH and configuring one or more PHY parameters associated with a second BLER target performance; and transmit, to the base station, the second PUSCH using the one or more PHY parameters associated with the second BLER target performance, wherein the second PUSCH includes a retransmission of the first PUSCH or a new transmission based at least in part on a HARQ process indicated in the DCI.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
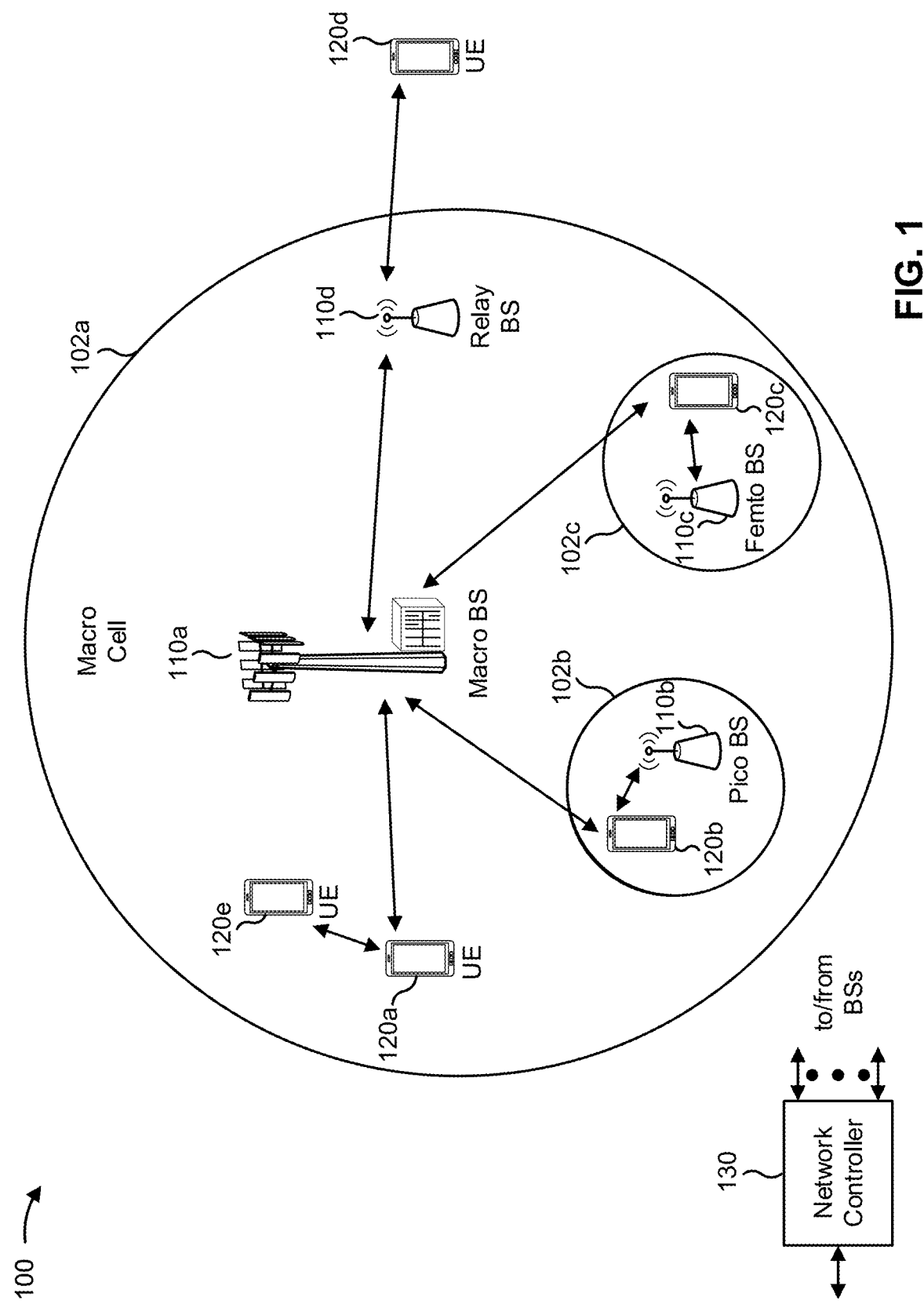
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
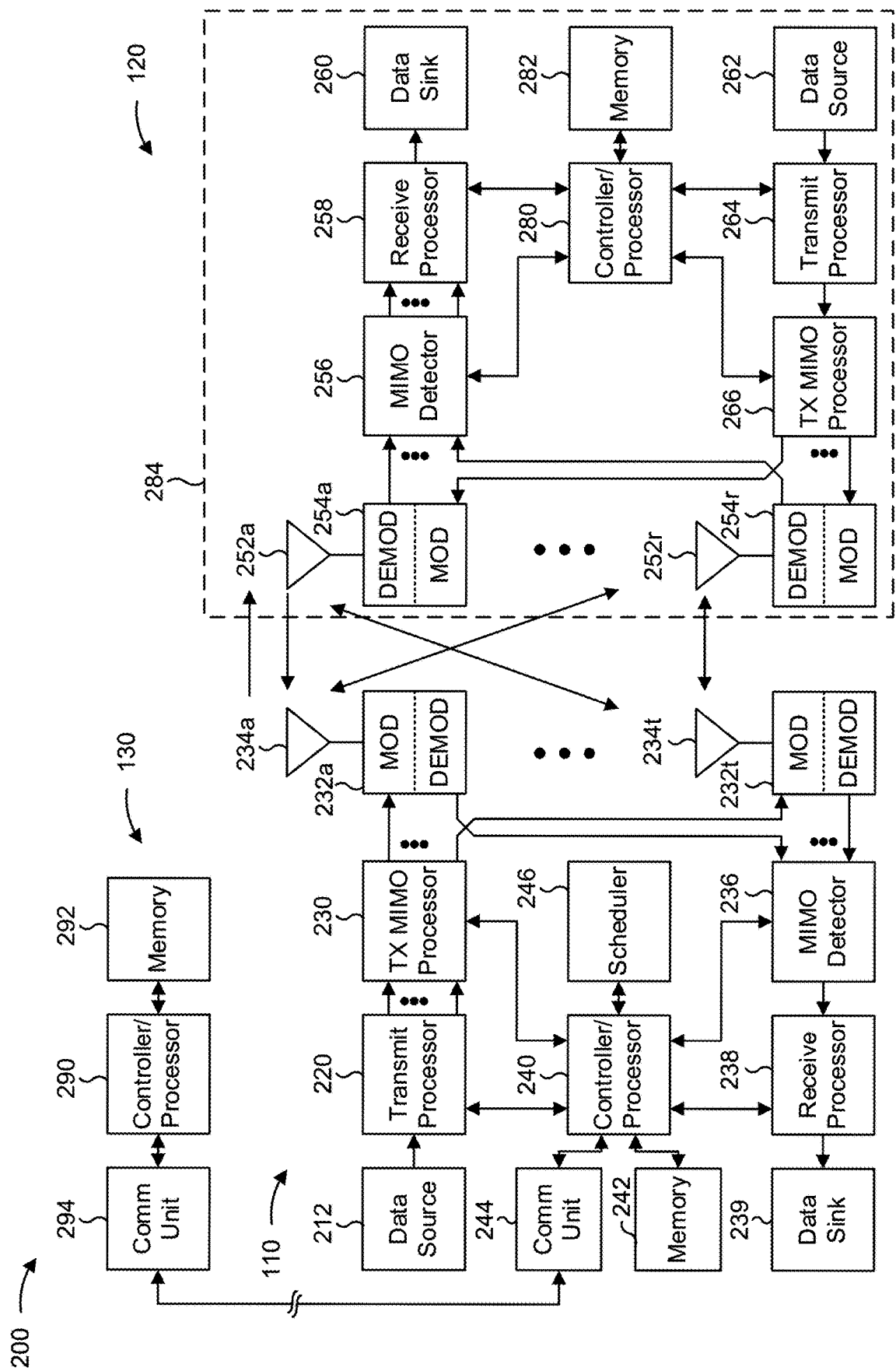
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-6.

Controller/processor 240 of base station 110, controller/processor 280 of UE 120, and/or any other component(s) of FIG. 2 may perform one or more techniques associated with uplink hybrid automatic repeat request (HARQ) retransmission scheduling in a network with a large propagation delay, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, and/or interpreting the instructions, among other examples.

In some aspects, the UE 120 includes means for transmitting, to the base station 110, a first physical uplink shared channel (PUSCH) using one or more physical layer (PHY) parameters associated with a first block error rate (BLER) target performance; means for receiving, from the base station 110 prior to expiration of a round trip timer associated with the first PUSCH, downlink control information (DCI) scheduling a second PUSCH and configuring one or more PHY parameters associated with a second BLER target performance; and/or means for transmitting, to the base station 110, the second PUSCH using the one or more PHY parameters associated with the second BLER target performance, wherein the second PUSCH includes a retransmission of the first PUSCH or a new transmission based at least in part on a HARQ process indicated in the DCI. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for receiving, from the base station 110, radio resource control (RRC) signaling indicating one or more HARQ processes to support scheduling a new PUSCH transmission prior to expiration of the round trip timer for a previous transmission; and/or means for determining that the DCI includes an uplink grant for the new transmission based at least in part on the one or more HARQ processes indicated in the RRC signaling including the HARQ process indicated in the DCI.

In some aspects, the UE 120 includes means for receiving, from the base station 110, RRC signaling configuring the UE 120 to monitor a DCI format used to indicate different PHY parameters prior to expiration of the round trip timer for a previous transmission; and/or means for determining that the DCI configures the one or more PHY parameters associated with the second BLER target performance based at least in part on the DCI received from the base station 110 having the DCI format used to indicate different PHY parameters.

In some aspects, the UE 120 includes means for receiving, from the base station 110, RRC signaling configuring a bit in the DCI to indicate whether one or more fields in the DCI indicate different PHY parameters prior to expiration of the round trip timer for a previous transmission; and/or means for determining that the DCI configures the one or more PHY parameters associated with the second BLER target performance based at least in part on the bit in the DCI indicating that the one or more fields in the DCI indicate different PHY parameters.

In some aspects, the UE 120 includes means for determining that the HARQ process indicated in the DCI received prior to the expiration of the round trip timer is associated with the first PUSCH; and/or means for determining that the DCI includes an uplink grant for the new transmission based at least in part on the base station 110 previously scheduling at least one retransmission of the first PUSCH or configuring at least one coverage enhancement for an original transmission of the first PUSCH.

In some aspects, the UE 120 includes means for determining that the HARQ process indicated in the DCI received prior to the expiration of the round trip timer is associated with the first PUSCH; and/or means for determining that the DCI includes only an uplink grant for the retransmission of the first PUSCH based at least in part on the base station 110 not previously scheduling at least one retransmission of the first PUSCH and not configuring at least one coverage enhancement for an original transmission of the first PUSCH.

In some aspects, the UE 120 includes means for determining that the one or more PHY parameters configured in the DCI represent a new set of PHY parameters for the retransmission of the first PUSCH based at least in part on receiving the DCI while the round trip timer is running or while an offset timer delaying a start of the round trip timer is running.

In some aspects, the UE 120 includes means for determining that the one or more PHY parameters configured in the DCI represent the one or more PHY parameters associated with the first BLER target performance based at least in part on receiving the DCI while a discontinuous reception retransmission timer is running.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
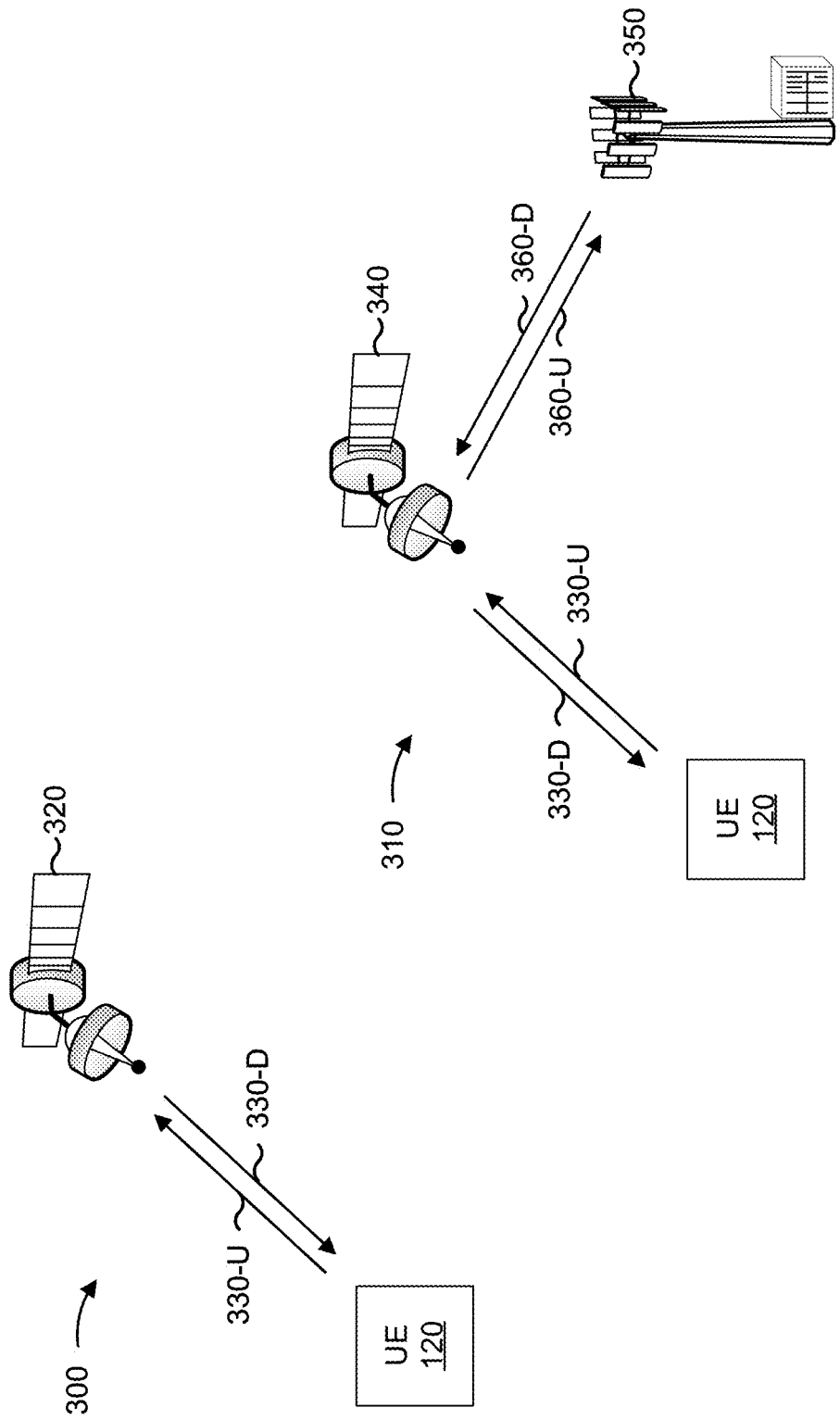
FIG. 3 is a diagram illustrating an example of a regenerative satellite deployment and an example of a transparent satellite deployment in a non-terrestrial network, in accordance with various aspects of the present disclosure.

FIG. 3 is a diagram illustrating an example 300 of a regenerative satellite deployment and an example 310 of a transparent satellite deployment in a non-terrestrial network.

Example 300 shows a regenerative satellite deployment. In example 300, a UE 120 is served by a satellite 320 via a service link 330. For example, the satellite 320 may include a BS 110 (e.g., BS 110a) or a gNB. In some aspects, the satellite 320 may be referred to as a non-terrestrial base station, a regenerative repeater, and/or an on-board processing repeater, among other examples. In some aspects, the satellite 320 may demodulate an uplink radio frequency signal, and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may be a transparent satellite. The satellite 340 may relay a signal received from a gateway 350 via a feeder link 360. For example, the satellite 340 may receive a radio frequency transmission from the gateway 350 via the feeder link 360, and may relay the radio frequency transmission to the UE 120 via the service link 330 without demodulating the radio frequency transmission. Additionally, or alternatively, the satellite 340 may receive a radio frequency transmission from the UE 120 via the service link 330, and may relay the radio frequency transmission to the gateway 350 via the feeder link 360 without demodulating the radio frequency transmission. In some aspects, the satellite 340 may frequency convert radio frequency transmissions received on the service link 330 to a frequency of the radio frequency transmission on the feeder link 360 (or vice versa), and may amplify and/or filter the relayed radio frequency transmission. In some aspects, the UEs 120 shown in example 300 and example 310 may be associated with a Global Navigation Satellite System (GNSS) capability or a Global Positioning System (GPS) capability, though not all UEs have such capabilities. The satellite 340 may provide a cell that covers the UE 120.

As shown in FIG. 3, the service link 330 may include a link between the satellite 340 and the UE 120, and may include one or more of an uplink or a downlink. The feeder link 360 may include a link between the satellite 340 and the gateway 350, and may include one or more of an uplink (e.g., from the UE 120 to the gateway 350) or a downlink (e.g., from the gateway 350 to the UE 120). As shown in FIG. 3, an uplink of the service link 330 is indicated by reference number 330-U and a downlink of the service link 330 is indicated by reference number 330-D. Similarly, an uplink of the feeder link 360 is indicated by reference number 360-U and a downlink of the feeder link 360 is indicated by reference number 360-D.

The feeder link 360 and the service link 330 may each experience Doppler effects due to the movement of the satellites 320 and 340, and potentially movement of a UE 120. The Doppler effects may be significantly larger than in a terrestrial network. The Doppler effect on the feeder link 360 may be compensated for to some degree, but may still be associated with some amount of uncompensated frequency error. Furthermore, the gateway 350 may be associated with a residual frequency error, and/or the satellite 320/340 may be associated with an on-board frequency error. These sources of frequency error may cause a received downlink frequency at the UE 120 to drift from a target downlink frequency. Furthermore, due to the long distance between the UE 120 and satellite 320/340, communication in a non-terrestrial network may be associated with a much longer delay (e.g., longer latency and/or round trip time) than a terrestrial network. The delay may be even greater in a transparent satellite deployment, as any communication between the UE 120 and the gateway 350 must travel over the service link 330 and the feeder link 360, each of which may associated with a longer delay than a terrestrial network. The large propagation delay in a non-terrestrial network may pose various challenges, including how to schedule uplink HARQ retransmissions before a decoding result is known for a previous uplink transmission.

As indicated above, FIG. 3 is provided as an example. Other examples may differ from what is described with regard to FIG. 3.

Figure 4:
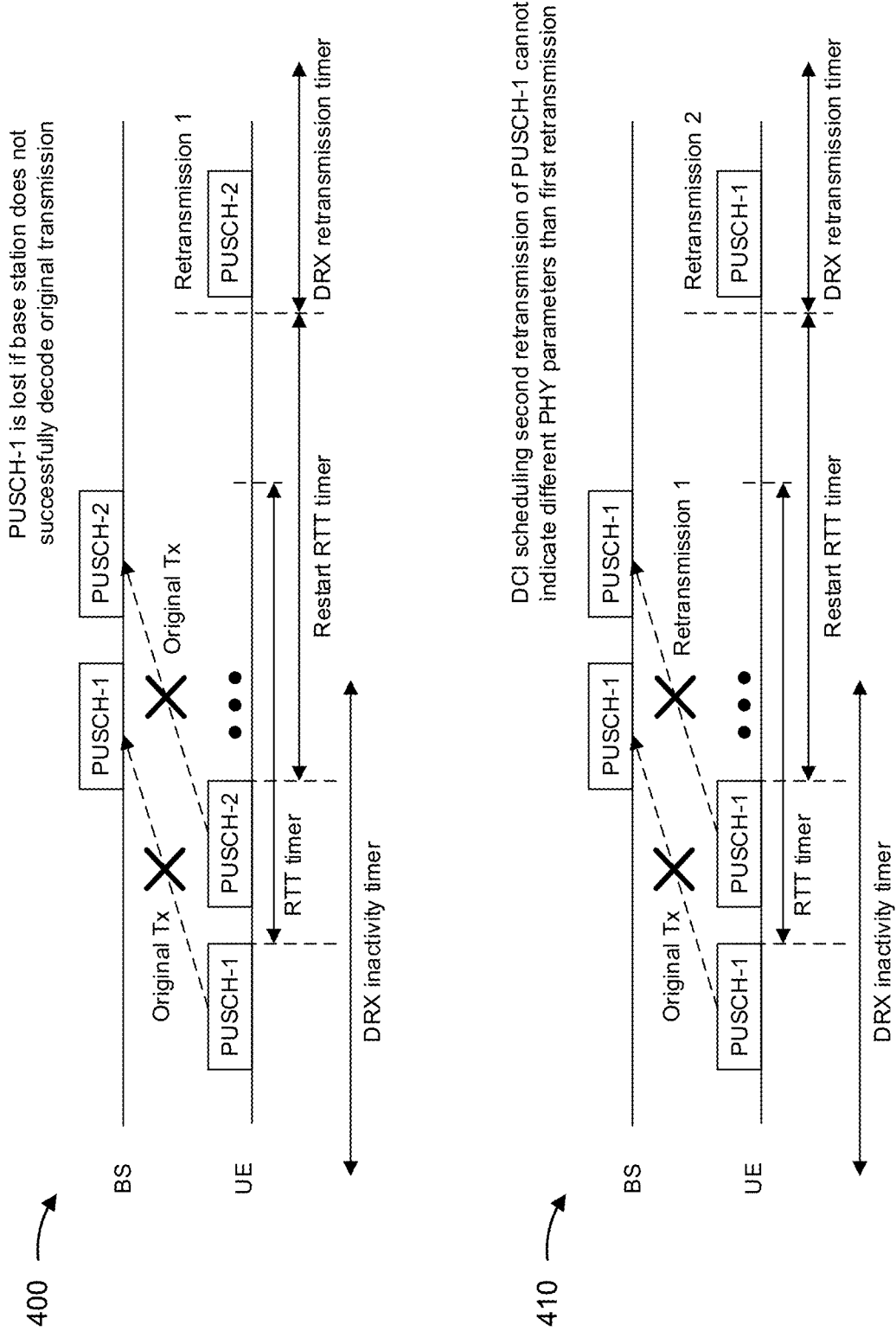
FIG. 4 is a diagram illustrating an example of downlink control information (DCI) including a new transmission grant and an example of DCI including a retransmission grant in a network with a large propagation delay, in accordance with various aspects of the present disclosure.

FIG. 4 is a diagram illustrating an example 400 of DCI including a new transmission grant and an example 450 of DCI including a retransmission grant in a network with a large propagation delay (e.g., a non-terrestrial network), in accordance with various aspects of the present disclosure.

As shown in FIG. 4, and by example 400, a base station may dynamically disable HARQ retransmission for a first physical uplink shared channel (PUSCH) by transmitting, to a UE, DCI that includes an uplink grant to schedule a new PUSCH (e.g., a new transport block) prior to determining a decoding result for the first PUSCH. For example, the base station may initially transmit, to the UE, DCI that schedules the first PUSCH and indicates one or more physical layer (PHY) parameters to be used for the first PUSCH. The first PUSCH may be associated with a HARQ process that corresponds to a buffer in which the UE stores a corresponding transport block. As shown in FIG. 4, after the UE performs an original transmission of the first PUSCH, the UE starts a round trip timer (RTT), which may be restarted if another PUSCH (e.g., a retransmission of the first PUSCH or a new transmission) is transmitted while the round trip timer is running. When the round trip timer expires, the UE may start a discontinuous reception (DRX) retransmission timer, and the UE may expect an uplink grant for a retransmission only while the DRX retransmission timer is running. In other words, the UE generally does not expect any scheduling while the round trip timer is running and prior to starting the DRX retransmission timer. However, in some cases, a wireless network may enable a base station to transmit DCI to schedule a new PUSCH transmission while the round trip timer associated with a HARQ process is running (e.g., to enable earlier transmission of a new transport block), which dynamically disables retransmission of the first PUSCH associated with the HARQ process.

Accordingly, problems may arise in cases where the base station transmits DCI to the UE to schedule a new PUSCH associated with the same HARQ process as the first PUSCH in a network with a large propagation delay, as the new PUSCH may be scheduled before the base station receives the first PUSCH and/or determines whether the first PUSCH is successfully decoded. For example, when the base station schedules the second PUSCH with the same HARQ process as the first PUSCH, retransmission of the first PUSCH is disabled because the transport block carried in the first PUSCH is flushed from the buffer corresponding to the HARQ process and replaced with the transport block to be carried in the second PUSCH. As a result, the first PUSCH would be lost in cases where the base station does not receive and/or fails to successfully decode the first PUSCH, which is particularly undesirable for high-priority uplink traffic (e.g., a radio resource control (RRC) message).

Furthermore, in cases where the base station transmits DCI that includes a retransmission grant for the first PUSCH after the DRX retransmission timer has started, the UE retransmits the second PUSCH because the transport block of the second PUSCH is stored in the buffer corresponding to the HARQ process of the retransmission grant even though the base station expects a retransmission of the first PUSCH. Additionally, or alternatively, if the DCI scheduling the original transmission of the second PUSCH is lost (e.g., not received and/or unsuccessfully decoded by the UE), a retransmission grant for the HARQ process shared by the first PUSCH and the second PUSCH may cause the UE to retransmit the first PUSCH even though the base station expects a retransmission of the second PUSCH.

Furthermore, in some cases, the base station may indicate a different physical layer (PHY) configuration for the first PUSCH and the second PUSCH when transmitting the DCI to schedule the second PUSCH as a new transmission. For example, as described above, transmitting the DCI to schedule the second PUSCH using the same HARQ process as the first PUSCH disables retransmission of the first PUSCH, which may occur in cases where one or more reliability and/or coverage enhancements are enabled for the first PUSCH (e.g., slot aggregation with multiple repetitions, frequency hopping, and/or high transmission power, among other examples). However, a different (e.g., less reliable) PHY configuration may be indicated for the second PUSCH because HARQ retransmission for the second PUSCH can be scheduled after the DRX retransmission has started. Accordingly, in some cases, a block error rate (BLER) target performance for the first PUSCH may differ from a BLER target performance for the second PUSCH, whereby the DCI used to schedule the original transmission of the second PUSCH may indicate a different PHY configuration than the first PUSCH. However, existing DCI formats generally lack a capability to indicate that a scheduling DCI for a particular HARQ process indicates a new PHY configuration.

Accordingly, in cases where the UE receives DCI scheduling a PUSCH for a new transmission associated with a HARQ process (e.g., the DCI includes an uplink grant with a new data indicator (NDI) bit toggled) before the round trip timer has expired for a previous PUSCH associated with the same HARQ process, the UE may be unable to determine whether the DCI dynamically disables retransmission of the previous PUSCH. Furthermore, in cases where the base station dynamically disables HARQ retransmission for the previous PUSCH (e.g., the base station schedules a new PUSCH transmission in a HARQ process before determining a decoding result for a previous PUSCH transmission in the same HARQ process), the base station may need to inform the UE as to whether the PHY configuration to be used for the new PUSCH transmission is different from the previous PUSCH transmission (e.g., is associated with different power control parameters such as a loop index, a different MCS table, a different DMRS configuration, a different time domain allocation, a different frequency hopping configuration, and/or a different slot aggregation configuration, among other examples). However, as mentioned above, existing signaling techniques lack a capability to indicate whether a base station intends to disable HARQ retransmission for a PUSCH transmission associated with a HARQ process before determining a decoding result for the PUSCH transmission and/or to indicate a different PHY configuration for a new PUSCH transmission when disabling HARQ retransmission for a PUSCH transmission associated with a HARQ process.

Furthermore, the inability to indicate a different PHY configuration in DCI before a decoding result is determined for a PUSCH transmission associated with a HARQ process may cause similar problems when the base station needs to schedule a PUSCH retransmission with different PHY parameters after the round trip timer has expired for a HARQ process. For example, as shown by example 410, the base station may schedule a first PUSCH transmission (PUSCH-1) and may schedule a retransmission of the first PUSCH transmission before receiving and/or decoding the original transmission of the first PUSCH. In such cases, if the base station fails to receive and successfully decode both the original transmission and the retransmission of the first PUSCH, the base station may schedule a second retransmission of the first PUSCH after the round trip timer has expired (e.g., after the DRX retransmission timer has started for the first PUSCH). In this case, the base station may need to indicate a different PHY configuration for the second retransmission relative to the first retransmission (e.g., a higher uplink power and/or a more reliable MCS, among other examples) to increase a probability of the base station receiving and decoding the first PUSCH. However, a DCI format used to schedule the first retransmission may be the same as the DCI format used to schedule the second retransmission, whereby the base station may be unable to indicate, and the UE may be unable to determine, a different PHY configuration to be used for the second retransmission (e.g., a PHY configuration to achieve a lower BLER target for the second retransmission).

Some aspects described herein relate to techniques and apparatuses to schedule, configure, or otherwise use an uplink HARQ process that supports a new HARQ transmission (e.g., a PUSCH carrying a new transport block) prior to a base station determining a decoding result for a previous PUSCH transmission in the same HARQ process. For example, as will be described in more detail below with reference to FIG. 5, a UE may transmit a first PUSCH to a base station using one or more PHY parameters associated with a first BLER target performance for a HARQ process. In cases where the UE receives DCI scheduling a second PUSCH from the base station prior to expiration of a round trip timer associated with the first PUSCH, the UE may determine one or more PHY parameters associated with a second BLER target performance for the HARQ process based on the DCI. The UE may then transmit, to the base station, the second PUSCH using the PHY parameter(s) associated with the second BLER target performance, which may be the same or different than the PHY parameter(s) associated with the first BLER target performance. Furthermore, as described herein, the second PUSCH may be a retransmission of the first PUSCH associated with the HARQ process or a new transmission in the same HARQ process.

As indicated above, FIG. 4 is provided as an example. Other examples may differ from what is described with respect to FIG. 4.

Figure 5:
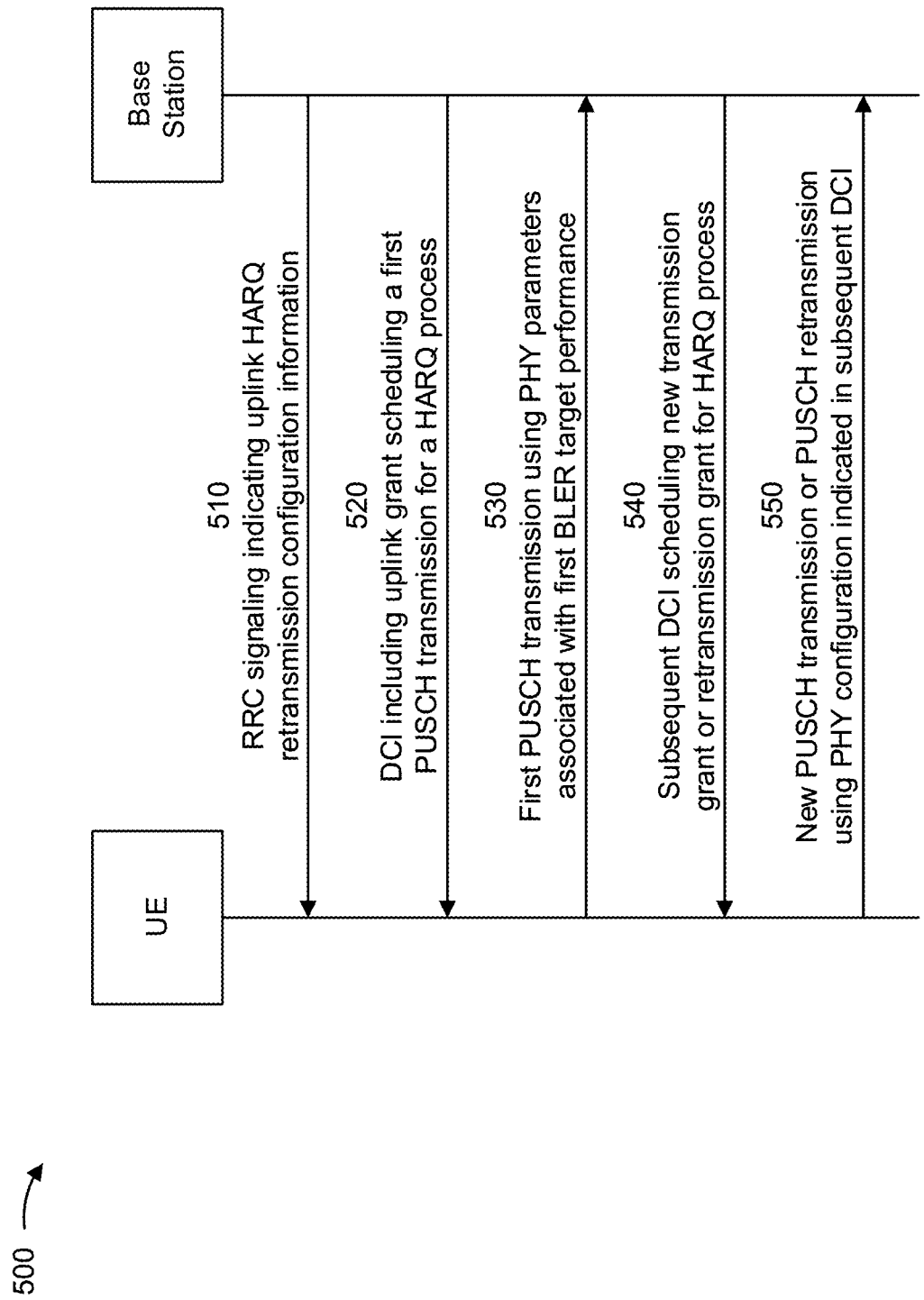
FIG. 5 is a diagram illustrating an example associated with uplink hybrid automatic repeat request (HARQ) retransmission scheduling in a network with a large propagation delay, in accordance with various aspects of the present disclosure.

FIG. 5 is a diagram illustrating an example 500 associated with uplink HARQ retransmission scheduling in a network with a large propagation delay, in accordance with various aspects of the present disclosure. As shown in FIG. 5, example 500 includes communication between a base station (e.g., base station 110) and a UE (e.g., UE 120). In some aspects, the base station and the UE may be included in a wireless network (e.g., wireless network 100) with a large propagation delay, such as a non-terrestrial network. In some aspects, the base station and the UE may communicate via a wireless access link, which may include an uplink and a downlink. Additionally, or alternatively, the base station and the UE may communicate using a wireless access link and a wireless feeder link (e.g., via a transparent satellite), each of which may include an uplink and a downlink.

As shown in FIG. 5, and by reference number 510, the base station may transmit, and the UE may receive, RRC signaling that indicates uplink HARQ retransmission configuration information. For example, the uplink HARQ retransmission configuration information may enable the base station to transmit DCI that includes an uplink grant associated with a HARQ process before determining a decoding result for a previous PUSCH associated with the same HARQ process (e.g., to schedule a new PUSCH in the same HARQ process and thereby disable HARQ retransmission for the previous PUSCH and/or to indicate a PHY configuration for a new PUSCH and/or a retransmission of the previous PUSCH).

For example, in some aspects, the RRC signaling may indicate one or more HARQ processes that are configured to support scheduling a new PUSCH transmission before a round trip timer has expired for a previous PUSCH (e.g., the base station can transmit DCI that includes an uplink grant to schedule a new PUSCH in the one or more HARQ processes before determining a decoding result of the previous PUSCH transmission associated with the same HARQ process). For example, a wireless network may support a maximum quantity (e.g., up to eight (8)) HARQ processes that are each associated with a separate buffer, and the RRC signaling may indicate one or more of the HARQ processes that support an uplink grant to schedule a new PUSCH prior to expiration of a round trip timer for a previous PUSCH associated with the one or more HARQ processes (e.g., HARQ processes in which retransmission can be dynamically disabled by scheduling a new PUSCH before the round trip timer has expired for the previous PUSCH associated with the HARQ process). Furthermore, when the UE receives an uplink grant associated with a HARQ process that supports a new transmission uplink grant prior to expiration of a round trip timer for a previous PUSCH associated with the HARQ process, DCI carrying the uplink grant may indicate a new BLER target performance for the new transmission uplink grant. For example, in some aspects, the DCI may indicate a different PHY configuration to meet the new BLER target performance, such as different power control parameters, a different MCS table, a different DMRS configuration, a different time domain allocation, a different frequency hopping configuration, and/or a different slot aggregation configuration.

Additionally, or alternatively, the RRC signaling may configure the UE to monitor a DCI format that is used to indicate that one or more fields in the DCI indicate a change to one or more PHY parameters (e.g., a different MCS table or uplink power control) for a new target BLER performance. For example, base stations that are deployed in a wireless network and/or UEs served by the base stations that are deployed in a wireless network may not universally support the DCI format used to indicate a different PHY configuration. Accordingly, in some aspects, the RRC signaling may indicate whether the UE is to monitor the DCI format for a particular HARQ process (e.g., based on whether the base station and/or the UE support the DCI format), which may indicate to the UE whether to expect an uplink grant for a new PUSCH transmission in the same HARQ process as a previous PUSCH transmission before the round trip timer has expired for the previous PUSCH transmission. Additionally, or alternatively, one or more bits in an existing DCI format may be repurposed to indicate that one or more fields in the DCI indicate a change to one or more PHY parameters. For example, in some aspects, one or more bits may be repurposed in a DCI format used for PUSCH scheduling (e.g., DCI format 0_0 or 0_1) and/or a DCI format used to indicate transmit power control commands for uplink transmissions (e.g., DCI format 2_2 or 2_3), among other examples. In this case, the RRC signaling may indicate whether one or more bits in an existing DCI format are repurposed to indicate that fields in the DCI are to be interpreted differently to determine a different PHY configuration when the DCI carries an uplink grant for a HARQ process before the round trip timer has expired for a previous PUSCH associated with the HARQ process.

As further shown in FIG. 5, and by reference number 520, the base station may transmit, and the UE may receive, DCI that includes an uplink grant to schedule a first PUSCH transmission for a HARQ process. For example, in some aspects, the uplink grant may indicate a PHY configuration that includes one or more PHY parameters associated with a first BLER target performance for the first PUSCH, which may be an original transport block transmission. In some aspects, the uplink grant may be provided to the UE based at least in part on a scheduling request (SR) transmitted from the UE to the base station and/or a buffer status report (BSR) that indicates that the UE has uplink data available to transmit. For example, the SR and/or BSR may indicate a logical channel group in which the UE has uplink data available to transmit, and the base station may determine the HARQ process in which to provide the uplink grant based at least in part on the logical channel group indicated by the UE. For example, the logical channel group may be associated with a quality of service (QoS) requirement, which the base station may use to determine whether to provide the uplink grant in a HARQ process that supports scheduling a new PUSCH transmission prior to expiration of a round trip timer (e.g., such that HARQ transmission of the PUSCH can be dynamically disabled) or in a different HARQ process.

As further shown in FIG. 5, and by reference number 530, the UE may transmit a first PUSCH using one or more PHY parameters associated with a first BLER target performance (e.g., based on the HARQ process and/or one or more fields in the scheduling DCI that indicate the PHY configuration to meet the first BLER target performance). As described in further detail above, the UE may start a round trip timer after transmitting the first PUSCH, and may monitor for one or more DCI messages that may schedule a second PUSCH in the same HARQ process (e.g., a new PUSCH or a retransmission of the first PUSCH) while the round trip timer is running.

As further shown in FIG. 5, and by reference number 540, the base station may transmit, and the UE may receive, another DCI message that includes an uplink grant associated with the same HARQ process as the first PUSCH. Furthermore, as described herein, the subsequent DCI message may be received prior to expiration of the round trip timer associated with the first PUSCH and may configure one or more PHY parameters associated with a second BLER target performance, which may be the same as or different from the first BLER target performance for the first PUSCH. Accordingly, as described herein, the UE may apply various rules to determine whether the uplink grant carried in the subsequent DCI is for a new (e.g., original) PUSCH or a retransmission of the earlier PUSCH for which the round trip timer has not expired and to determine the PHY parameters to be used for the PUSCH that is scheduled to be transmitted by the uplink grant carried in the DCI message.

For example, as described above, the UE may generally start a round trip timer after transmitting the first PUSCH, and may expect an uplink grant to configure a new BLER target performance prior to expiration of the round trip timer in cases where the HARQ process associated with the first PUSCH is one of the HARQ processes configured by RRC signaling to support an uplink grant that configures a new BLER target performance. Additionally, or alternatively, the UE may expect the uplink grant to configure a new BLER target performance in cases where the DCI carrying the uplink grant has a specific format associated with indicating different PHY parameters (e.g., to satisfy a particular BLER target performance) and/or one or more bits in the DCI carrying the uplink grant indicate that one or more fields in the DCI are used to indicate different PHY parameters. Furthermore, in some aspects, whether the uplink grant is interpreted as scheduling a new PUSCH (e.g., a new transport block, such that HARQ retransmission of the first PUSCH is dynamically disabled) or scheduling a retransmission of the first PUSCH may depend on the PHY configuration and/or other scheduling parameters associated with the first PUSCH transmission.

For example, when the uplink grant is received for the HARQ process associated with the first PUSCH before the round trip timer has expired for the first PUSCH, the UE may determine that the uplink grant schedules a new PUSCH only in cases where the base station has already scheduled one or more retransmissions for the first PUSCH and/or a coverage enhancement was configured for the previous PUSCH transmission (e.g., slot aggregation, multiple repetitions, frequency hopping, among other examples). For example, in cases where one or more retransmissions for the first PUSCH have already been scheduled and/or a coverage enhancement was configured for the previous PUSCH transmission, the base station is more likely to successfully receive and decode the previous PUSCH transmission and may therefore dynamically disable HARQ retransmission for the previous PUSCH transmission. Accordingly, if the UE determines that the uplink grant is received for the HARQ process associated with the first PUSCH before the round trip timer has expired for the first PUSCH, the UE may determine that the uplink grant is for a new PUSCH transmission if the base station previously scheduled one or more retransmissions for the first PUSCH and/or enabled a coverage enhancement for the previous PUSCH transmission. Otherwise, if the UE determines that one or more retransmissions have not been scheduled for the first PUSCH and that a coverage enhancement was not configured for the previous PUSCH transmission, the UE may expect an uplink grant to include only a retransmission grant for the previous PUSCH transmission associated with the HARQ process while the round trip timer is running (e.g., before the DRX retransmission timer is started) and/or may expect retransmission grants after the DRX retransmission timer is started (e.g., after the round trip timer has expired).

Furthermore, in cases where the uplink grant schedules a retransmission of the first PUSCH, the base station may configure the UE to interpret the PHY configuration indicated in the DCI depending on whether the round trip timer or an offset timer used to delay a start of the round trip timer is running. For example, in cases where the DCI includes an uplink grant to schedule a retransmission of the first PUSCH (e.g., the NDI bit is not toggled), the UE may interpret the PHY configuration indicated in the DCI as representing a new set of PHY parameters to satisfy a different BLER target performance if the DCI is received while the round trip timer or offset timer is running. Otherwise, if the DCI includes an uplink grant to schedule a retransmission of the first PUSCH (e.g., the NDI bit is not toggled) and the round trip timer or offset timer is not running, the UE may interpret the PHY configuration indicated in the DCI as representing an existing set of values for the PHY parameters.

Accordingly, as further shown in FIG. 5, and by reference number 550, the UE may transmit a second PUSCH using the PHY configuration indicated in the subsequent DCI. For example, as described above, the DCI may include an uplink grant to schedule the second PUSCH in the same HARQ process as the first PUSCH, and the UE may determine whether the second PUSCH is to be configured as a retransmission of the first PUSCH or a new transmission (e.g., flushing the transport block of the first PUSCH from the HARQ process buffer) based on a PHY configuration for the first PUSCH and/or a time when the DCI is received. Additionally, or alternatively, the second PUSCH may be associated with a second BLER target performance, which may be the same as or different from the first BLER target performance associated with the first PUSCH. In either case, the UE may determine one or more PHY parameters for the second PUSCH to satisfy the second BLER target performance (e.g., based on the HARQ process associated with the first and second PUSCH, one or more fields in the DCI scheduling the second PUSCH, and/or a status of a round trip timer or offset timer that is started after the UE transmits the first PUSCH).

Furthermore, in cases where the base station dynamically disables HARQ retransmission for the first PUSCH by scheduling the second PUSCH as a new transmission before the round trip timer has expired for the first PUSCH, the base station may enable one or more features to enable a quick recovery from a HARQ transmission loss (e.g., failure to receive and/or decode the first PUSCH for which HARQ retransmission was disabled). For example, in cases where HARQ retransmission is disabled, any retransmission needs to be handled at a radio link control (RLC) level. Accordingly, to enable a quick recovery from uplink HARQ transmission failure, the base station may transmit an RLC status report to the UE on a downlink when no retransmission is scheduled or HARQ retransmission is otherwise disabled for a PUSCH that the base station fails to receive and/or decode. In this case, the RLC status report may cause the UE to immediately retransmit the PUSCH that the base station failed to receive and/or decode (e.g., before the transport block is flushed from the buffer associated with the HARQ process). Similarly, for a downlink HARQ transmission failure, the base station may signal the UE to trigger an RLC status report, and the signal to trigger the RLC status report may be piggybacked in the DCI scheduling the PUSCH to cause the UE to transmit the RLC status report.

As indicated above, FIG. 5 is provided as an example. Other examples may differ from what is described with respect to FIG. 5.

Figure 6:
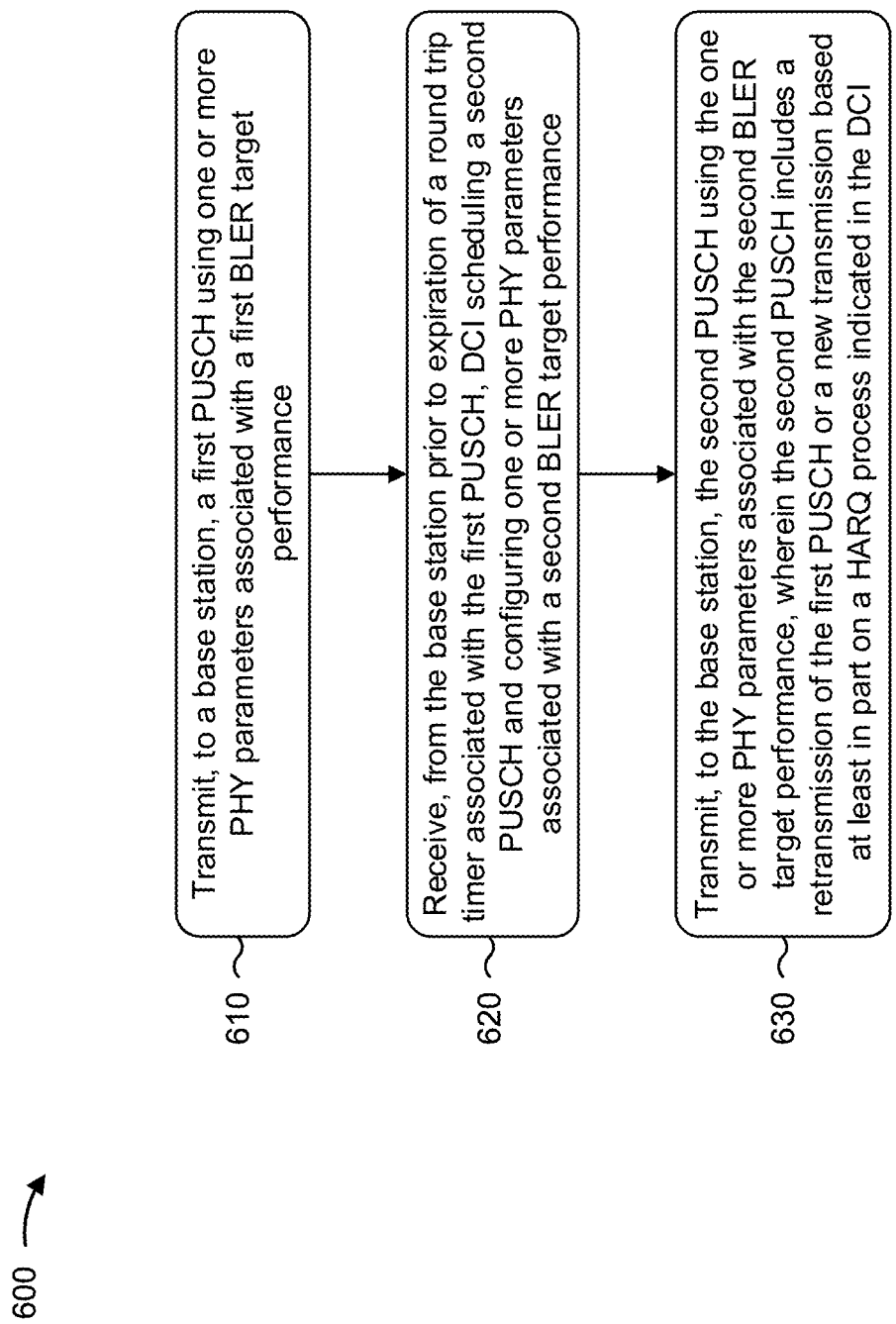
FIG. 6 is a diagram illustrating an example process associated with uplink HARQ retransmission scheduling in a network with a large propagation delay, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120) performs operations associated with uplink HARQ retransmission scheduling in a network with a large propagation delay.

As shown in FIG. 6, in some aspects, process 600 may include transmitting, to a base station, a first PUSCH using one or more PHY parameters associated with a first BLER target performance (block 610). For example, the UE (e.g., using transmission component 704, depicted in FIG. 7) may transmit, to a base station, a first PUSCH using one or more PHY parameters associated with a first BLER target performance, as described above.

As further shown in FIG. 6, in some aspects, process 600 may include receiving, from the base station prior to expiration of a round trip timer associated with the first PUSCH, DCI scheduling a second PUSCH and configuring one or more PHY parameters associated with a second BLER target performance (block 620). For example, the UE (e.g., using reception component 702, depicted in FIG. 7) may receive, from the base station prior to expiration of a round trip timer associated with the first PUSCH, DCI scheduling a second PUSCH and configuring one or more PHY parameters associated with a second BLER target performance, as described above.

As further shown in FIG. 6, in some aspects, process 600 may include transmitting, to the base station, the second PUSCH using the one or more PHY parameters associated with the second BLER target performance, wherein the second PUSCH includes a retransmission of the first PUSCH or a new transmission based at least in part on a HARQ process indicated in the DCI (block 630). For example, the UE (e.g., using transmission component 704, depicted in FIG. 7) may transmit, to the base station, the second PUSCH using the one or more PHY parameters associated with the second BLER target performance, wherein the second PUSCH includes a retransmission of the first PUSCH or a new transmission based at least in part on a HARQ process indicated in the DCI, as described above.

Process 600 may include additional aspects, such as any single aspect or any combination of aspects described below and/or in connection with one or more other processes described elsewhere herein.

In a first aspect, process 600 includes receiving, from the base station, RRC signaling indicating one or more HARQ processes to support scheduling a new PUSCH transmission prior to expiration of the round trip timer for a previous transmission, and determining that the DCI includes an uplink grant for the new transmission based at least in part on the one or more HARQ processes indicated in the RRC signaling including the HARQ process indicated in the DCI.

In a second aspect, alone or in combination with the first aspect, process 600 includes receiving, from the base station, RRC signaling configuring the UE to monitor a DCI format used to indicate different PHY parameters prior to expiration of the round trip timer for a previous transmission, and determining that the DCI configures the one or more PHY parameters associated with the second BLER target performance based at least in part on the DCI received from the base station having the DCI format used to indicate different PHY parameters.

In a third aspect, alone or in combination with one or more of the first and second aspects, process 600 includes receiving, from the base station, RRC signaling configuring a bit in the DCI to indicate whether one or more fields in the DCI indicate different PHY parameters prior to expiration of the round trip timer for a previous transmission, and determining that the DCI configures the one or more PHY parameters associated with the second BLER target performance based at least in part on the bit in the DCI indicating that the one or more fields in the DCI indicate different PHY parameters.

In a fourth aspect, alone or in combination with one or more of the first through third aspects, process 600 includes determining that the HARQ process indicated in the DCI received prior to the expiration of the round trip timer is associated with the first PUSCH, and determining that the DCI includes an uplink grant for the new transmission based at least in part on the base station previously scheduling at least one retransmission of the first PUSCH or configuring at least one coverage enhancement for an original transmission of the first PUSCH.

In a fifth aspect, alone or in combination with one or more of the first through fourth aspects, process 600 includes determining that the HARQ process indicated in the DCI received prior to the expiration of the round trip timer is associated with the first PUSCH, and determining that the DCI includes only an uplink grant for the retransmission of the first PUSCH based at least in part on the base station not previously scheduling at least one retransmission of the first PUSCH and not configuring at least one coverage enhancement for an original transmission of the first PUSCH.

In a sixth aspect, alone or in combination with one or more of the first through fifth aspects, process 600 includes determining that the one or more PHY parameters configured in the DCI represent a new set of PHY parameters for the retransmission of the first PUSCH based at least in part on receiving the DCI while the round trip timer is running or while an offset timer delaying a start of the round trip timer is running.

In a seventh aspect, alone or in combination with one or more of the first through sixth aspects, process 600 includes determining that the one or more PHY parameters configured in the DCI represent the one or more PHY parameters associated with the first BLER target performance based at least in part on receiving the DCI while a DRX retransmission timer is running.

In an eighth aspect, alone or in combination with one or more of the first through seventh aspects, the first BLER target performance is the same as the second BLER target performance.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
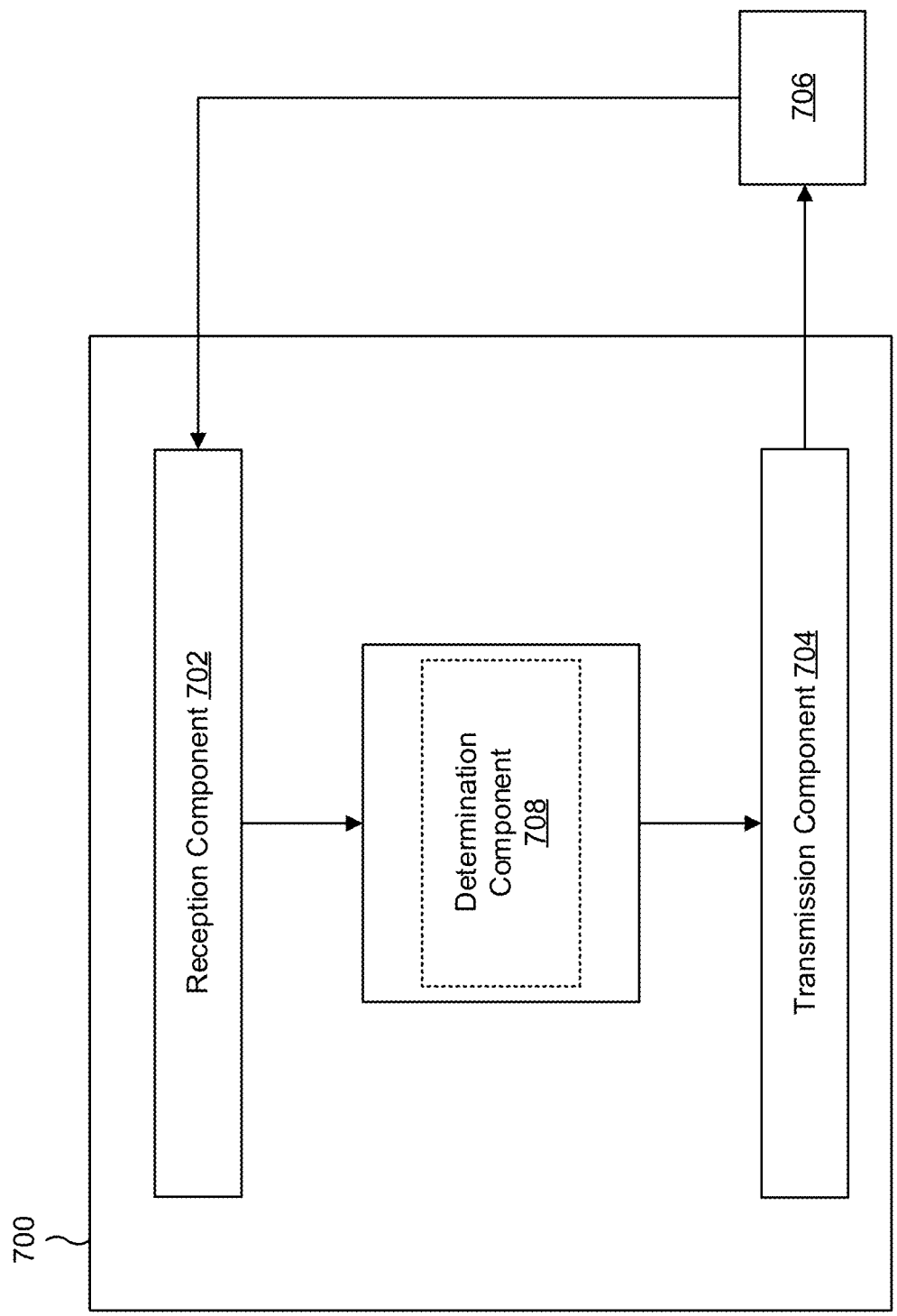
FIGS. 7-8 are block diagrams of example apparatuses for wireless communication, in accordance with various aspects of the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a determination component 708, among other examples.

In some aspects, the apparatus 700 may be configured to perform one or more operations described herein in connection with FIG. 5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The transmission component 704 may transmit, to a base station, a first PUSCH using one or more PHY parameters associated with a first BLER target performance. The reception component 702 may receive, from the base station prior to expiration of a round trip timer associated with the first PUSCH, DCI scheduling a second PUSCH and configuring one or more PHY parameters associated with a second BLER target performance. The transmission component 704 may transmit, to the base station, the second PUSCH using the one or more PHY parameters associated with the second BLER target performance, wherein the second PUSCH includes a retransmission of the first PUSCH or a new transmission based at least in part on a HARQ process indicated in the DCI.

The reception component 702 may receive, from the base station, RRC signaling indicating one or more HARQ processes to support scheduling a new PUSCH transmission prior to expiration of the round trip timer for a previous transmission. The determination component 708 may determine that the DCI includes an uplink grant for the new transmission based at least in part on the one or more HARQ processes indicated in the RRC signaling including the HARQ process indicated in the DCI.

The reception component 702 may receive, from the base station, RRC signaling configuring the UE to monitor a DCI format used to indicate different PHY parameters prior to expiration of the round trip timer for a previous transmission. The determination component 708 may determine that the DCI configures the one or more PHY parameters associated with the second BLER target performance based at least in part on the DCI received from the base station having the DCI format used to indicate different PHY parameters.

The reception component 702 may receive, from the base station, RRC signaling configuring a bit in the DCI to indicate whether one or more fields in the DCI indicate different PHY parameters prior to expiration of the round trip timer for a previous transmission. The determination component 708 may determine that the DCI configures the one or more PHY parameters associated with the second BLER target performance based at least in part on the bit in the DCI indicating that the one or more fields in the DCI indicate different PHY parameters.

The determination component 708 may determine that the HARQ process indicated in the DCI received prior to the expiration of the round trip timer is associated with the first PUSCH, and the determination component 708 may determine that the DCI includes only an uplink grant for the new transmission based at least in part on the base station previously scheduling at least one retransmission of the first PUSCH or configuring at least one coverage enhancement for an original transmission of the first PUSCH.

The determination component 708 may determine that the HARQ process indicated in the DCI received prior to the expiration of the round trip timer is a HARQ process associated with the first PUSCH, and the determination component 708 may determine that the DCI includes an uplink grant for the retransmission of the first PUSCH based at least in part on the base station not previously scheduling at least one retransmission of the first PUSCH and not configuring at least one coverage enhancement for an original transmission of the first PUSCH.

The determination component 708 may determine that the one or more PHY parameters configured in the DCI represent a new set of PHY parameters for the retransmission of the first PUSCH based at least in part on receiving the DCI while the round trip timer is running or while an offset timer delaying a start of the round trip timer is running.

The determination component 708 may determine that the one or more PHY parameters configured in the DCI represent the one or more PHY parameters associated with the first BLER target performance based at least in part on receiving the DCI while a DRX retransmission timer is running.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
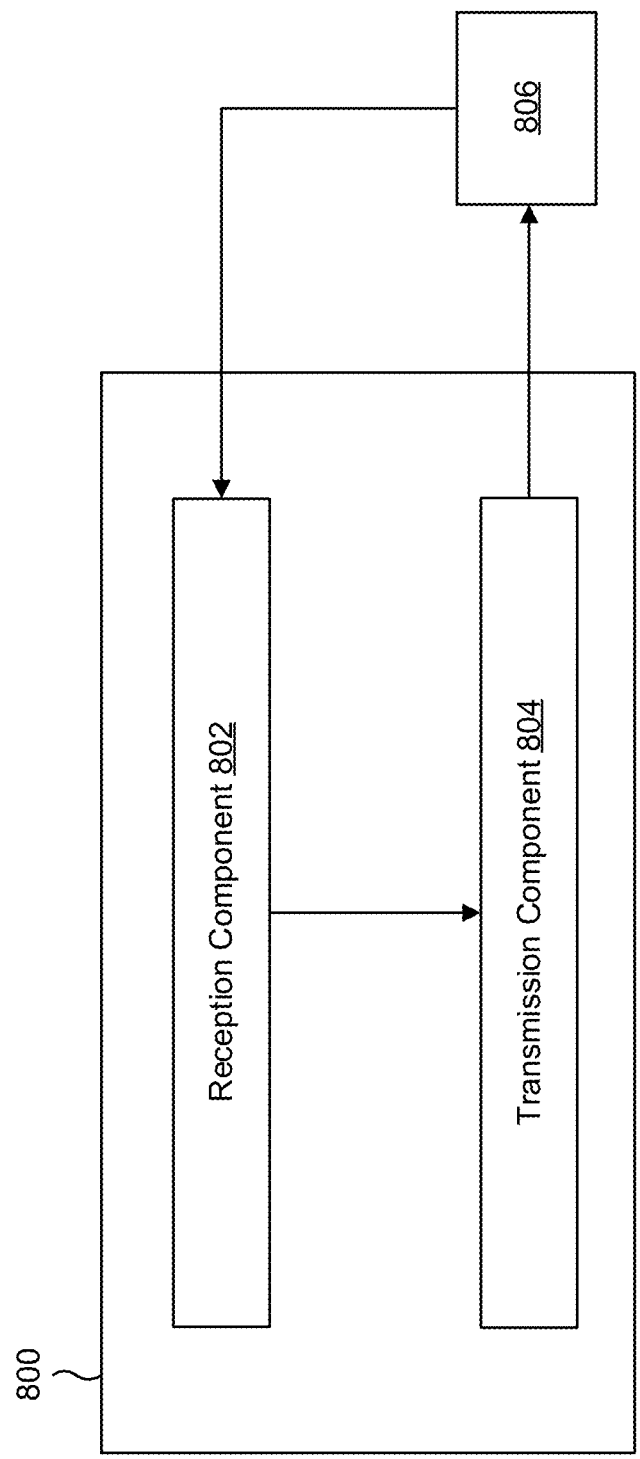

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804.

In some aspects, the apparatus 800 may be configured to perform one or more operations described herein in connection with FIG. 5. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some aspects of the present disclosure:

Aspect 1: A method of wireless communication performed by a UE, comprising: transmitting, to a base station, a first PUSCH using one or more PHY parameters associated with a first BLER target performance; receiving, from the base station prior to expiration of a round trip timer associated with the first PUSCH, DCI scheduling a second PUSCH and configuring one or more PHY parameters associated with a second BLER target performance; and transmitting, to the base station, the second PUSCH using the one or more PHY parameters associated with the second BLER target performance, wherein the second PUSCH includes a retransmission of the first PUSCH or a new transmission based at least in part on a HARQ process indicated in the DCI.

Aspect 2: The method of aspect 1, further comprising: receiving, from the base station, RRC signaling indicating one or more HARQ processes to support scheduling a new PUSCH transmission prior to expiration of the round trip timer for a previous transmission; and determining that the DCI includes an uplink grant for the new transmission based at least in part on the one or more HARQ processes indicated in the RRC signaling including the HARQ process indicated in the DCI.

Aspect 3: The method of aspect 1, further comprising: receiving, from the base station, RRC signaling configuring the UE to monitor a DCI format used to indicate different PHY parameters prior to expiration of the round trip timer for a previous transmission; and determining that the DCI configures the one or more PHY parameters associated with the second BLER target performance based at least in part on the DCI received from the base station having the DCI format used to indicate different PHY parameters.

Aspect 4: The method of aspect 1, further comprising: receiving, from the base station, RRC signaling configuring a bit in the DCI to indicate whether one or more fields in the DCI indicate different PHY parameters prior to expiration of the round trip timer for a previous transmission; and determining that the DCI configures the one or more PHY parameters associated with the second BLER target performance based at least in part on the bit in the DCI indicating that the one or more fields in the DCI indicate different PHY parameters.

Aspect 5: The method of any of aspects 1-4, further comprising: determining that the HARQ process indicated in the DCI received prior to the expiration of the round trip timer is associated with the first PUSCH; and determining that the DCI includes an uplink grant for the new transmission based at least in part on the base station previously scheduling at least one retransmission of the first PUSCH or configuring at least one coverage enhancement for an original transmission of the first PUSCH.

Aspect 6: The method of any of aspects 1-4, further comprising: determining that the HARQ process indicated in the DCI received prior to the expiration of the round trip timer is associated with the first PUSCH; and determining that the DCI includes only an uplink grant for the retransmission of the first PUSCH based at least in part on the base station not previously scheduling at least one retransmission of the first PUSCH and not configuring at least one coverage enhancement for an original transmission of the first PUSCH.

Aspect 7: The method of aspect 6, further comprising: determining that the one or more PHY parameters configured in the DCI represent a new set of PHY parameters for the retransmission of the first PUSCH based at least in part on receiving the DCI while the round trip timer is running or while an offset timer delaying a start of the round trip timer is running.

Aspect 8: The method of aspect 6, further comprising: determining that the one or more PHY parameters configured in the DCI represent the one or more PHY parameters associated with the first BLER target performance based at least in part on receiving the DCI while a DRX retransmission timer is running.

Aspect 9: The method of any of aspects 1-8, wherein the first BLER target performance is the same as the second BLER target performance.

Aspect 10: An apparatus for wireless communication at a device, comprising a processor; memory coupled with the processor; and instructions stored in the memory and executable by the processor to cause the apparatus to perform the method of any of aspects 1-9.

Aspect 11: A device for wireless communication, comprising a memory and one or more processors coupled to the memory, the memory and the one or more processors configured to perform the method of any of aspects 1-9.

Aspect 12: An apparatus for wireless communication, comprising at least one means for performing the method of any of aspects 1-9.

Aspect 13: A non-transitory computer-readable medium storing code for wireless communication, the code comprising instructions executable by a processor to perform the method of any of aspects 1-9.

Aspect 14: A non-transitory computer-readable medium storing a set of instructions for wireless communication, the set of instructions comprising one or more instructions that, when executed by one or more processors of a device, cause the device to perform the method of any of aspects 1-9.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE), comprising:
   a memory comprising instructions; and
   one or more processors configured to execute the instructions and cause the UE to:
      transmit, to a base station, a first physical uplink shared channel (PUSCH) using one or more first physical layer (PHY) parameters associated with a first block error rate (BLER) target performance;
      receive, from the base station prior to expiration of a round trip timer associated with the first PUSCH, downlink control information (DCI) being configured to schedule a second PUSCH and to configure one or more second PHY parameters associated with a second BLER target performance; and
      transmit, to the base station, the second PUSCH using the one or more second PHY parameters, wherein the second PUSCH includes a retransmission of the first PUSCH or a new transmission.

2. The UE of claim 1, wherein the one or more processors are further configured to execute the instructions and cause the UE to:
   receive, from the base station, radio resource control (RRC) signaling indicating one or more hybrid automatic repeat request (HARQ) processes to support scheduling a new PUSCH transmission prior to expiration of the round trip timer for a previous transmission, wherein the DCI includes an uplink grant for the new transmission, and wherein the one or more HARQ processes indicated in the RRC signaling include a HARQ process indicated in the DCI.

3. The UE of claim 1, wherein the one or more processors are further configured to execute the instructions and cause the UE to:
   receive, from the base station, radio resource control signaling configuring the UE to monitor a DCI format used to indicate different PHY parameters prior to expiration of the round trip timer for a previous transmission, wherein the DCI has the DCI format.

4. The UE of claim 1, wherein the one or more processors are further configured to execute the instructions and cause the UE to:
   receive, from the base station, radio resource control signaling configuring a bit in the DCI to indicate whether one or more fields in the DCI indicate different PHY parameters prior to expiration of the round trip timer for a previous transmission, wherein the different PHY parameters comprise the one or more second PHY parameters.

5. The UE of claim 1,
   wherein the DCI is further configured to indicate a hybrid automatic repeat request (HARQ) process associated with the first PUSCH, and
   wherein the DCI includes an uplink grant for the new transmission.

6. The UE of claim 1,
wherein the DCI is further configured to indicate a hybrid automatic repeat request (HARQ) process associated with the first PUSCH, and
wherein the DCI includes only an uplink grant for the retransmission of the first PUSCH.

7. The UE of claim 1, wherein the one or more second PHY parameters represent a new set of PHY parameters for the retransmission of the first PUSCH.

8. The UE of claim 1, wherein the one or more second PHY parameters represent the one or more first PHY parameters when the DCI is received while a discontinuous reception retransmission is running.

9. The UE of claim 1,
wherein the first BLER target performance is the same as or different from the second BLER target performance.

10. The UE of claim 1,
wherein the DCI is further configured to indicate a hybrid automatic repeat request (HARQ) process, and
wherein whether the second PUSCH includes the retransmission of the first PUSCH or the new transmission is based at least on the HARQ process indicated in the DCI.

11. The UE of claim 1, wherein whether the second PUSCH includes the retransmission of the first PUSCH or the new transmission is based at least on the one or more second PHY parameters.

12. A method of wireless communication performed at a user equipment (UE), comprising:
transmitting, to a base station, a first physical uplink shared channel (PUSCH) using one or more first physical layer (PHY) parameters associated with a first block error rate (BLER) target performance;
receiving, from the base station prior to expiration of a round trip timer associated with the first PUSCH, downlink control information (DCI) being configured to schedule a second PUSCH and to configure one or more second PHY parameters associated with a second BLER target performance; and
transmitting, to the base station, the second PUSCH using the one or more second PHY parameters, wherein the second PUSCH includes a retransmission of the first PUSCH or a new transmission.

13. The method of claim 12, further comprising:
receiving, from the base station, radio resource control (RRC) signaling indicating one or more hybrid automatic repeat request (HARQ) processes to support scheduling a new PUSCH transmission prior to expiration of the round trip timer for a previous transmission, wherein the DCI includes an uplink grant for the new transmission, and wherein the one or more HARQ processes indicated in the RRC signaling include a HARQ process indicated in the DCI.

14. The method of claim 12, further comprising:
receiving, from the base station, radio resource control signaling configuring the UE to monitor a DCI format used to indicate different PHY parameters prior to expiration of the round trip timer for a previous transmission wherein the DCI has the DCI format.

15. The method of claim 12, further comprising:
receiving, from the base station, radio resource control signaling configuring a bit in the DCI to indicate whether one or more fields in the DCI indicate different PHY parameters prior to expiration of the round trip timer for a previous transmission wherein the different PHY parameters comprise the one or more second PHY parameters.

16. The method of claim 12,
wherein the DCI is further configured to indicate a hybrid automatic repeat request (HARQ) process associated with the first PUSCH, and
wherein the DCI includes an uplink grant for the new transmission.

17. The method of claim 12,
wherein the DCI is further configured to indicate a hybrid automatic repeat request (HARQ) process associated with the first PUSCH, and
wherein the DCI includes only an uplink grant for the retransmission of the first PUSCH.

18. The method of claim 12,
wherein the one or more second PHY parameters represent a new set of PHY parameters for the retransmission of the first PUSCH.

19. The method of claim 12,
wherein the one or more second PHY parameters represent the one or more first PHY parameters when the DCI is received while a discontinuous reception retransmission is running.

20. The method of claim 12,
wherein the first BLER target performance is the same as or different from the second BLER target performance.

21. The method of claim 12,
wherein the DCI is further configured to indicate a hybrid automatic repeat request (HARQ) process, and
wherein whether the second PUSCH includes the retransmission of the first PUSCH or the new transmission is based at least on the HARQ process indicated in the DCI.

22. The method of claim 12, wherein whether the second PUSCH includes the retransmission of the first PUSCH or the new transmission is based at least on the one or more second PHY parameters.

23. An apparatus for wireless communication, comprising:
means for transmitting, to a base station, a first physical uplink shared channel (PUSCH) using one or more first physical layer (PHY) parameters associated with a first block error rate (BLER) target performance;
means for receiving, from the base station prior to expiration of a round trip timer associated with the first PUSCH, downlink control information (DCI) being configured to schedule a second PUSCH and to configure one or more second PHY parameters associated with a second BLER target performance; and
means for transmitting, to the base station, the second PUSCH using the one or more second PHY parameters, wherein the second PUSCH includes a retransmission of the first PUSCH or a new transmission.

24. The apparatus of claim 23, further comprising:
means for receiving, from the base station, radio resource control signaling configuring the apparatus to monitor a DCI format used to indicate different PHY parameters prior to expiration of the round trip timer for a previous transmission, wherein the DCI has the DCI format.

25. The apparatus of claim 23, further comprising:
means for receiving, from the base station, radio resource control signaling configuring a bit in the DCI to indicate whether one or more fields in the DCI indicate different PHY parameters prior to expiration of the round trip timer for a previous transmission wherein the different PHY parameters comprise the one or more second PHY parameters.

26. The apparatus of claim 23,
wherein the DCI is further configured to indicate a hybrid automatic repeat request (HARQ) process associated with the first PUSCH, and
wherein the DCI includes an uplink grant for the new transmission.

27. The apparatus of claim 23,
wherein the DCI is further configured to indicate a hybrid automatic repeat request (HARQ) process associated with the first PUSCH, and
wherein the DCI includes only an uplink grant for the retransmission of the first PUSCH.

28. The apparatus of claim 23,
wherein the DCI is further configured to indicate a hybrid automatic repeat request (HARQ) process, and
wherein whether the second PUSCH includes the retransmission of the first PUSCH or the new transmission is based at least on the HARQ process indicated in the DCI.

29. The apparatus of claim 23, wherein whether the second PUSCH includes the retransmission of the first PUSCH or the new transmission is based at least on the one or more second PHY parameters.

30. A non-transitory computer-readable medium storing a set of instructions for wireless communication, the set of instructions comprising:
one or more instructions that, when executed by one or more processors of a user equipment (UE), cause the UE to:
transmit, to a base station, a first physical uplink shared channel (PUSCH) using one or more first physical layer (PHY) parameters associated with a first block error rate (BLER) target performance;
receive, from the base station prior to expiration of a round trip timer associated with the first PUSCH, downlink control information (DCI) being configured to schedule a second PUSCH and to configure one or more second PHY parameters associated with a second BLER target performance; and
transmit, to the base station, the second PUSCH using the one or more second PHY parameters, wherein the second PUSCH includes a retransmission of the first PUSCH or a new transmission.

\* \* \* \* \*